United States Patent [19]

Coliandris et al.

[11] Patent Number: 4,719,543

[45] Date of Patent: Jan. 12, 1988

[54] REPLACEABLE LAMP UNIT FOR AUTOMOBILE HEADLIGHT

[75] Inventors: Chris Coliandris, Hillsboro; Paul F. Belliveau, Peterborough; Sudhir Parikh, Goffstown, all of N.H.

[73] Assignee: GTE Products Corporation, Danvers, Mass.

[21] Appl. No.: 11,668

[22] Filed: Feb. 6, 1987

[51] Int. Cl.[4] .............................................. B60Q 1/04

[52] U.S. Cl. ...................................... 362/80; 362/226; 362/267; 219/10.43; 219/10.53; 219/10.57

[58] Field of Search ........................ 362/267, 80, 226; 219/10.53, 10.43, 10.57

[56] References Cited

U.S. PATENT DOCUMENTS

| | | | |
|---|---|---|---|
| 3,923,580 | 12/1975 | Leatherman | 219/10.53 |
| 4,547,838 | 10/1985 | Wabimizu | 362/267 |
| 4,569,005 | 2/1986 | Bergin et al. | 362/267 |
| 4,609,977 | 9/1986 | Eckhardt et al. | 362/267 |

*Primary Examiner*—Albert W. Davis, Jr.

*Attorney, Agent, or Firm*—Lawrence R. Fraley

[57] ABSTRACT

An improved replaceable lamp unit for use in an automobile headlight wherein the exterior surface of the unit's metallic insert is provided with a roughened surface (e.g., 125 RMS) such that an improved bond between the insert and the unit's plastic holder is possible. Alignment between the unit's lamp (e.g., tungsten halogen bulb) and holder, and thus the reflecting surfaces of the reflector in which the unit eventually will operate, is significantly improved, as is the time for attaining same. The roughened texture may be sandblasted, knurled, acid-etched or embossed.

8 Claims, 5 Drawing Figures

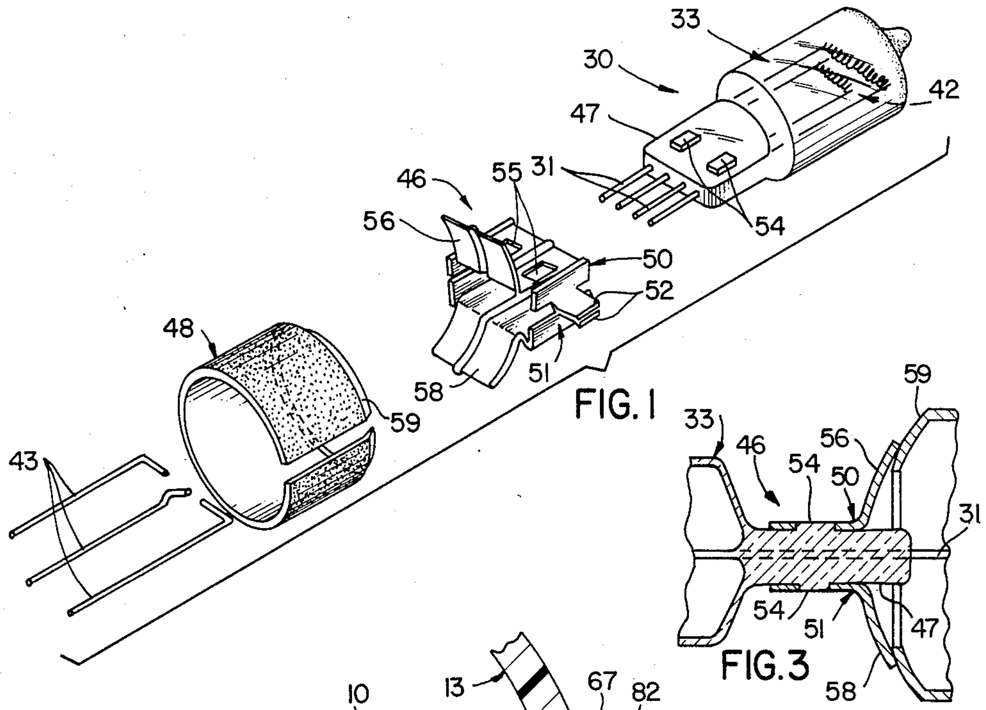
FIG. 1
FIG. 3
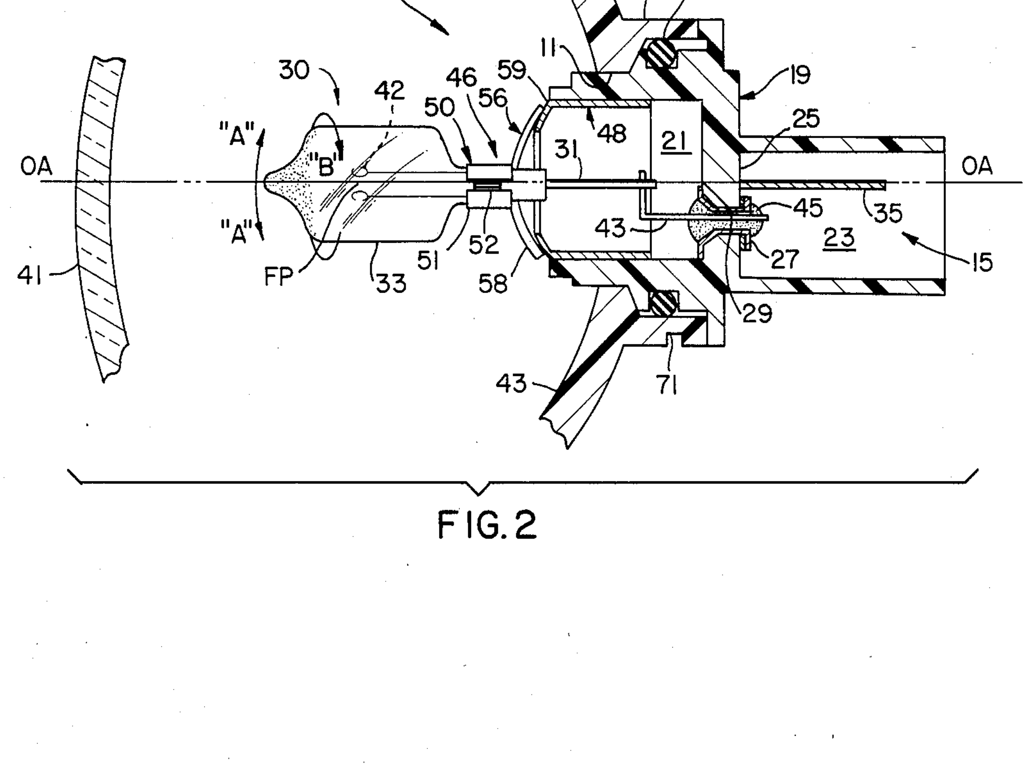
FIG. 2

REPLACEABLE LAMP UNIT FOR AUTOMOBILE HEADLIGHT

DESCRIPTION

1. Technical Field

The invention relates in general to automobile headlights and more particularly to replaceable lamp units for utilization within such headlights.

2. Background

Recent examples of replaceable lamp units are described and illustrated in U.S. Pat. Nos. 4,528,619 (Dolan et al), 4,569,005 (Bergin et al), 4,569,006 (Bergin et al) and 4,623,958 (Van de Linde et al), all of which are assigned to the same assignee as the instant invention. As will be understood from the following, the instant invention particularly relates to units such as defined in these patents (and even more particularly to those such as in U.S. Pat. No. 4,569,005) which utilize a plastic holder and metallic insert to which is secured, directly or indirectly (e.g., through a flanged clamp member) the desired light source (e.g., a tungsten halogen bulb having either a singular coiled filament or a dual coiled filament structure therein). The teachings of U.S. Pat. Nos. 4,528,619, 4,569,005, 4,569,006 and 4,623,958 are thus incorporated herein by reference.

As described below, the invention defines an improved replaceable lamp unit wherein the improvement substantially involves enhanced securement of the unit's metallic insert (sleeve) to the plastic holder of the unit such that critical alignment between the finished unit's lamp and the reflector of the headlight in which the unit is positioned is attainable in substantially less time and in a more positive manner than units such as defined in the aforementioned patents. Substantial reductions in manufacturing costs are thus possible using the teachings herein, as well as, more significantly, a finished product of better quality.

DISCLOSURE OF THE INVENTION

It is a primary object of the invention to provide an improved replaceable lamp unit for an automobile headlight.

It is yet another object of the invention to provide such a unit which can be produced using mass production techniques and thus resulting in substantial manufacturing cost savings over prior techniques.

In accordance with one aspect of the invention, there is defined an improved replaceable lamp unit for use within an automobile headlight wherein the unit includes a plastic holder and a metallic insert to which the lamp of said unit is directly or indirectly attached. The insert is positioned within the holder and secured thereto by induction heating and includes an exterior surface for engaging the holder when so positioned therein. As defined herein, this exterior surface includes a roughened (e.g., sandblasted) texture which enables enhanced securement to the holder during the defined induction heating operation.

BRIEF DESCRIPTION OF THE DRAWINGS

FIG. 1 is an exploded perspective view of a replaceable lamp unit, excluding holder, in accordance with the teachings of the instant invention;

FIG. 2 is a side elevational view of the unit of FIG. 1 on a slightly enlarged scale;

FIG. 3 is a side elevational view of the replaceable lamp unit of FIG. 1, including insert, holder, and electric lamp, as positioned within an automobile headlight reflector and accompanying lens assembly;

BEST MODE FOR CARRYING OUT THE INVENTION

Figure 4:
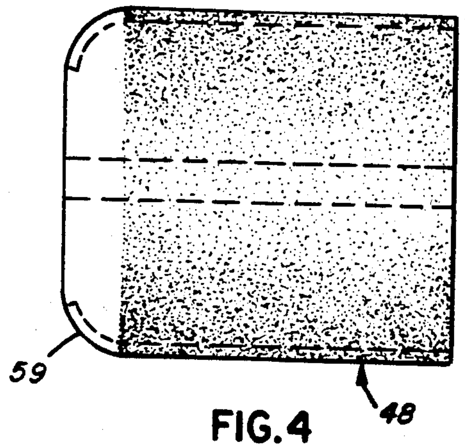
FIG. 4 is an enlarged view of the metallic insert of FIG. 1.

For a better understanding of the present invention, together with other and further objects, advantages and capabilities thereof, reference is made to the following disclosure and appended claims in connection with the above-described drawing.

As stated, the invention represents an improvement over replaceable lamp units wherein a plastic holder and metallic insert (sleeve) are utilized as part thereof. Specific examples of such units are defined in U.S. Pat. Nos. 4,528,619, 4,569,005, 4,569,006 and 4,623,958. Of these, the invention particularly represents an improvement to the embodiment of the type defined in U.S. Pat. No. 4,569,005, although it is of course understood that these teachings are not to be limited strictly thereto.

With particular attention to FIG. 1, there is illustrated in a perspective view several components which form part of the improved replaceable lamp unit 10 (FIG. 2) of the instant invention, said unit capable of being removably positioned within the rear opening 11 of a reflector 13 which forms part of an automobile headlight. Lamp unit 10, like those in the aforementioned patents, is designed for being electrically connected to an external connector (not shown) which comprises part of the electrical circuitry of the automobile using the headlight. Specifically, this external connector is designed for being inserted within the rear portion 15 of unit 10 after the unit has been positioned within the reflector's opening. Such a connector typically includes a plurality of electrical wires which also form part of the automobile's circuit. These wires are thus either directly or indirectly connected to the power source (e.g., 6- or 12-volt battery) typically found in most automobiles.

Unit 10 includes an electrically insulative. plastic holder 19 which defines therein a first cavity 21 and a second cavity 23, said cavities separated by a common wall member 25. Holder 19 is comprised of a heat and impact resistant plastic (e.g., polyphenyline sulfide) and is thus readily suited for use within the relatively harsh environments associated with automobile headlights. A preferred example of such a material is "Ryton R4", a thermoplastic available from the Phillips Petroleum Company, Pasadena, Tex. Ryton R4 is a glass-filled thermoplastic (containing about thirty percent by weight glass) and has a melting temperature of about 530 degrees Fahrenheit (F). An alternative material is another thermoplastic sold under the name "Ultem" by the General Electric Company, Burlington, Mass.

Unit 10 preferably further includes at least two (only one being shown) electrically conductive members 27 which are each fixedly secured within a respective one of a similar number of apertures 29 (one shown in FIG. 2) located within wall member 25. It is understood that a minimum of two apertures and corresponding electrically conductive members 27 are utilized in the embodiment in FIG. 1. In this embodiment, three members 27

(and apertures 29) are actually utilized because holder 19 accommodates a dual filament, tungsten halogen lamp 30. Typically, tungsten halogen lamps which include a dual coil filament structure 42 (such as shown in FIGS. 1 and 2) in turn include at least four lead-in wires 31 (only one being shown in FIG. 2) which project externally from the glass envelope 33 of the lamp. In the case of a single coil tungsten filament lamp, only two lead-in wires are typically utilized. It is understood that holder 19 is adapted for accommodating both single and double coil filament tungsten halogen lamps.

Each of the electrically conductive members 27 is preferably in the form of a conical shaped metal eyelet. A preferred material for each eyelet is tin-plated brass. Other suitable metals include aluminum, copper, steel, and a nickel-iron alloy.

Electrically connected to each eyelet is a metallic lug member 35 which includes a base segment positioned firmly against wall 25 and an upstanding leg segment which extends within second cavity 23. Accordingly, each of the lug members 35 (understandably, a total of three are used in the embodiment shown in the drawings) is designed for being inserted within a corresponding opening of the aforementioned external connector to provide electrical connection therewith when the connector is inserted within cavity 23.

Holder 19 is adapted for accommodating an electric lamp 30 which is preferably of the tungsten halogen variety, several examples of which are known in the art. When in final position within opening 11 of reflector 13, the envelope 33 of lamp 30 extends within the reflector and is substantially surrounded by the reflecting surfaces 43 thereof in such a manner so as to provide optimum light output from the headlight. The headlight further includes the forward lens member 41 secured to reflector 13 and designed for directing light in a predetermined pattern from the assembled unit. Understandably, alignment of envelope 33 and particularly the filament structure 42 contained therein relative to the internal reflective surfaces 43 of reflector 13 such that filament structure 42 is precisely oriented (i.e., centered on) relative to the reflector's optical axis OA-OA and, equally important, the reflector's focal point FP, is deemed critical to assure optimum light output. Accordingly, it is essential that lamp 30 be initially precisely oriented relative to holder 19 in a fixed relationship therewith such that when the holder is finally positioned within opening 11 this critical alignment is attained. Such precisioned alignment constitutes an important feature of the instant invention.

In FIG. 2, the lead-in wires 31 are shown projecting from envelope 33 into the first cavity 21 of holder 19. Positively secured (e.g., welded) to these wires in a predetermined manner are a plurality of rigid support wires 43, each preferably of L-shaped configuration and extending within (passing through) a corresponding one of the metallic eyelets 27. Each of these support wires is preferably of 0.080 inch outer diameter (O.D.) nickel-plated steel, although it is of course understood that other metals could be utilized. Attachment of each support wire 43 to a respective one of the conductive eyelets is achieved by soldering such that a quantity of solder 45 effectively surrounds the support wire centrally disposed therein. One example of a suitable solder for use in the invention is a 30/70 tin-lead composition. Other suitable compositions include a 60/40 tin-lead composition, and a 20/80 tin-lead composition. The solder, in addition to providing a sound electrical connection between the eyelet and support wire, also assures the defined hermeticity at this portion of the connection by virtue of its complete filling of the illustrated end portion of the eyelet. It also serves to rigidly maintain the support wire in a fixed position relative to holder 19 such that lamp 30 will be maintained in the substantially fixed position shown. Positive positioning of the lamp is thus assured. It is understood that wires 43 may constitute extensions of the lead-in wires 31 to which these are attached. In effect, these members thus form part of the lead-in wire assembly. Accordingly, it is possible to provide lead-in wires 31 of greater length, subject these to various bending operations (to form the configurations depicted in FIG. 2), and insert the ends thereof within respective eyelets 27, thus eliminating the need for support wires 43 as defined herein. In such an arrangement, these lead-in wires would assure the necessary rigid support function desired for the completed unit 10.

It should also be noted that in the embodiment of FIG. 3 only three support wires 43 are utilized to accommodate a total of four lead-in wires 31. This is because one of the support wires is welded (and thus electrically joined) to two lead-in wires to serve as a common lead in the overall circuit.

To provide effective connection between the respective lug members 35 and corresponding conductive eyelets 27, a mechanical operation is utilized. Specifically, a projecting end segment of each metallic eyelet is crimped over the leg portion of the respective lug member which rests against wall 25. Because the eyelet includes a flange portion at the opposing end thereof (against an opposing surface of wall 25), this crimping operation in effect draws the eyelet positively within the corresponding conical-shaped aperture 20. The result, therefore, is that a seal is provided between each eyelet and corresponding aperture. The defined crimping operation, as stated, functions to provide the essential electrical connection between lug and eyelet components.

Lamp unit 10 includes means for providing accurate alignment of the lamp's envelope (and contained filament structure) within the holder member. More specifically, lamp unit 10 provides means for precisely orienting the lamp's envelope (in at least three directions) relative to the locating surfaces of the holder which align with and engage the reflector when the holder is in final position within the reflector. This orientation prior to final securement of the lamp, including securement of the aforementioned lug and eyelet components, not only assures such precise alignment but, as explained below, is readily adaptable to mass production techniques.

In the embodiment shown in FIGS. 1–3, unit 10 includes a clamp member 46 which is secured about the press-sealed end portion 47 of envelope 33 at a precise location relative to the contained filament structure 42. Most significantly, however, unit 10 includes a metallic insert member 48 which is designed for occupying a predetermined, precise depth within cavity 21 of holder 19. Both member 48 and cavity 21 are of substantially cylindrical shape to facilitate such insertion. In addition, the clamp and insert members are both preferably comprised of steel (i.e., ASTME No. 430 drawn stainless steel), having a thickness of only about 0.018 inch.

Although unit 10 is shown to include clamp member 46 (such that the clamp serves to interconnect the unit's lamp and associated insert member, thus resulting in what can be defined as an "indirect" connection between lamp and insert), it is understood that the teachings of the invention are not specifically limited to such a structure (an "indirect" connection). That is, an alternative means for connecting insert member 48 to envelope 33 may be utilized, including directly securing an extension portion thereof (not shown) about the envelope's sealed end. One example of such a "direct" connection could involve the use of cement (as in U.S. Pat. No. 4,528,619) to secure the insert onto the lamp, or, alternatively, to directly clamp (i.e., crimp) a portion of the insert (not shown) onto the lamp's flattened press sealed end. Such a direct connection represents an alternative to the indirect envelope-insert member connection wherein the aforedefined interim clamp is employed. It is thus understood, therefore, that the teachings of this invention apply to such arrangements wherein a metallic insert and plastic holder are used, regardless of the form of connection between envelope and insert. Thus, the teachings herein may also be readily utilized in the units described in the aforementioned U.S. Pat. Nos. 4,528,619, 4,569,006 and, more recently, 4,623,958.

Clamp member 46, as particularly shown in FIGS. 1–3, is of two-part construction, comprising two opposing, substantially similar side elements 50 and 51 which, in assembly, are each positioned against an opposing side of the relatively flat end portion 47 such that end tabs 52 thereof become aligned and contact each other. A weld is used to join both opposing pairs (only one pair shown in FIG. 1) of tabs. Precise alignment of each side element may be achieved by the provision of two upstanding segments 54 on each opposing side (only two shown in FIG. 1) of sealed end portion 47 and a corresponding number of similarly shaped openings 55 within each side element. Understandably, the upstanding segments, which align with and are inserted within these openings, are precisely located at the time of pressing end portion 47. As is known in the art, press-sealing of a tungsten-halogen lamp envelope typically occurs only after the lamp's filament structure has been inserted to a prescribed depth within the glass tubing which eventually forms the lamp's envelope. This positioning relationship is best illustrated in FIG. 3. It is thus seen that clamp member 46 is accurately located relative to the filament structure 42.

With the clamp member in place (if used), the next step in assembling unit 10 involves partially inserting metallic insert member 48 within cavity 21. When achieved, preferably in a vertical orientation (lamp 30 being located upright during this operation), the lamp and clamp member assembly is lowered until flange portions 56 and 58 of elements 50 and 52 respectively engage an outer surface 59 of insert member 48. Flange portions 56 and 58 and outer surface 59 are both of similar curvature (see especially FIG. 3) to facilitate this engagement and, particularly, to facilitate alignment therebetween. This curvature is thus preferably substantially spherical or similarly rounded. Lamp 30 and clamp member 46 are then lowered, exerting a downward force on insert member 48, until member 48 occupies a predetermined, precise depth within cavity 21. This is considered the first of three directions of orientation. Lamp 30 and clamp member 46 are then moved in a side-to-side direction ("A" in FIG. 2) until the filament structure is substantially centered. Simultaneously with this movement, the envelope 33 is rotated ("B" in FIG. 2) to precisely orient the coiled filament structure in this matter. At all times, the curved flange portions 56 and 58 maintain contact with outer surface 59. When proper orientation is achieved (i.e., as determined by camera inspection), flange portions 56 and 58 are attached (welded) to surface 59. Laser welders are preferably used because these devices can be accurately aimed and triggered from a distance, thus not interfering with other components of the overall machine which provide assembly of the invention. Insert member 48, being metallic, is securedly positioned within the plastic holder 19 using RF (radio frequency) induction heating. That is, member 48 is heated to the point that softening of the inner walls of the holder occurs with said material thereafter permanently adhering to the insert. Filament structure 42 is thus precisely oriented within unit 10 relative to the aforementioned referencing surfaces of holder 19. During this orientation, the three support wires 43 were inserted within the respective eyelets 27 which in turn were only loosely positioned within their respective apertures 29. After the above aligning has occured, including fixed securement (welding) of the clamp and insert members, the lug members 35 are then secured to the respective eyelets using a crimping operation. The defined solder 45 is then applied and a substantially assembled unit 10 is ready for insertion within reflector 13.

In accordance with the teachings of the instant invention, lamp unit 10 includes improved means for securing the described metallic insert member 48 to the interior of plastic holder 19 during the aforementioned RF induction heating operation. Specifically, the insert member of unit 10 includes a roughened texture within the insert's exterior (outer) surfaces along the cylindrical side walls thereof. In FIGS. 1 and 4, this roughened outer surface is provided by sandblasting the side walls, said sandblasting not being done along the curvilinear forward walls 59 (which, as stated, mate with the clamp member 46).

Provision of a roughened texture results in the maximum concentration of heat generated within the metallic insert being located along this outer surface during the described induction heating. As is known, such heating is the result of eddy currents in the metal due to its electrical resistivity and the flow of alternating current through it. With the roughened surface, most of the heat induced is limited to this outer region. Such heat is then transferred by conduction to the plastic base to cause the aforementioned deformation thereof and eventual bonding (securing) to the insert. Because of the rough texture, the outer surface heats substantially faster than would the metallic insert absent such a surface, thereby decreasing the bonding time between insert and holder. In one example, bonding was achieved in about 0.2 to 0.5 seconds, whereas in a non-roughened insert, bonding typically required about 0.8 to about 1.4 seconds, representing a substantial time savings of between about 38 and 85 percent.

Most significantly, because the roughened surface region possesses the greater resistance in the insert, the thickness of the remaining part of the insert becomes irrelevant with regard to the induction heating process. Problems which may occur with varying thicknesses in insert material are thus eliminated.

It has been determined that the insert members as defined herein reached an outer surface temperature of about 550 degrees F. to about 700 degrees F. in the very limited time periods mentioned (e.g., 0.2 to 0.5 seconds). Because the Ryton R4 has a melting point of about 530 degrees F., as stated, bonding was thus achieved rapidly. Preferably, the insert is heated to about 100 degrees F. above the plastic's melt temperature.

It has also been determined that the described induction heating operation can occur either before or after the defined laser welding procedure, but preferably before. The insert is thus firmly and securedly affixed to the holder in a facile, precise and rapid fashion before the laser welders are activated to attach the clamp's flanges to the secured insert.

The defined securement of metallic insert to holder was achieved by placing the assembly in a Lepel RF generator for only about 0.2 seconds. This generator operates at 460 volts, producing 16 amperes, and is available from the Lepel Corporation, Maspeth, NY. It is of course understood that other generators may be used.

With further regard to the invention, it is understood that the side-to-side movement of envelope 33 can also include movement toward and away from the viewer in FIG. 2, or various alternative directions if desired, in place of or even in addition to that depicted by arrow "A". It is believed, however, that the extreme precision provided by the invention can be attained with only the three types of movement described above.

One significant feature of the above-described arrangement is that alignment can be achieved expeditiously and, in the preferred embodiment, without the need for cement or the like. Curing time for such material can add to the overall assembly time of such a unit. In addition, cements of this type can possibly outgas at elevated temperatures, such gas possibly adversely affecting the finished product (e.g., by affecting the internal reflective surfaces of the headlight's reflector).

As also shown in FIG. 2, reflector 13 includes a projecting neck portion 67 which extends from the rear portion of the reflector and is located about opening 11 (that is, opening 11 extends through the circumferential neck 67). Located within the exterior surfaces of neck portion 67 is at least one groove 71. To further assist in retaining holder 19 within opening 11, a removable cap member (not shown) is preferably utilized. This cap is adapted for being positioned within (engaging) the corresponding groove 71 and can include a resilient base segment designed for engaging an external surface of holder 19. Such a base segment is preferably resilient to allow flexure thereof during engagement with the holder to prevent lamp misalignment as a result of said engagement. Positioning of holder 19 within reflector 13 is accomplished merely by aligning corresponding slots (not shown) within the external surface of the holder with corresponding male protuberances or the like (not shown) which are spacedly located about the reflector opening 11. Holder 19, having lamp 30 fixedly and precisely positioned therein in the manner defined herein, is thus merely inserted within reflector 13 to the depth indicated in FIG. 2. There is thus no need for rotational-type movement of the holder in order to secure its final position within reflector 13. Thereafter, the aforedescribed cap member, preferably including a large central orifice adapted for passing over the exterior surfaces of the rear portion of holder 19, is simply screwed onto the upstanding neck portion 67 of reflector 13. Retention of this cap is preferably assured by provision of an upstanding flange on plastic holder 19. A similar number of projecting segments (not shown) which form part of the cap are designed for passing through various recesses after which the cap is rotated a short distance to effect locking.

To further assure a sound hermetic seal between the exterior surfaces of holder 19 and the corresponding internal surface of opening 11, a rubber O-ring 82 is provided. As shown in FIG. 2, O-ring 82 is positioned within a corresponding groove or slot within the holder's external surface and projects slightly thereabove. Accordingly, a compression fit is provided between the outermost edge of the O-ring and the internal surfaces of opening 11.

Thus it can be seen that by providing an insert as taught herein, the outer surfaces reach high temperatures substantially greater and faster than the remainder of the insert, causing a more rapid deformation (melting) of the plastic holder's interior walls. A surface region possessing these characteristics thus satisfies the term roughened as used herein. By way of further example, the roughness texture for the aforementioned sandblasted embodiment possessed a root-mean-square (RMS) average deviation from the mean surface of from about 120 to about 130 RMS. In a specific example, a texture of 125 RMS was observed. The "mean surface" referred to in this characteristic, as is known in the art, is the perfect surface that would be formed if all of the roughness peaks were cut off and used to fill the "valleys" below this surface. As stated, such peaks in the case of the instant invention thus serve as heat sinks for the metallic insert. As an alternative measurement, this roughness may also be expressed as the arithmetical average (AA) deviation from said mean surface. Using the RMS method, it was determined that metallic inserts used in prior replaceable headlamp units (i.e., U.S. Pat. No. 4,569,005) possessed an RMS of only 4, an average value for polished (smooth) stainless steel of the type mentioned above (ASTME No. 430).

Figure 5:
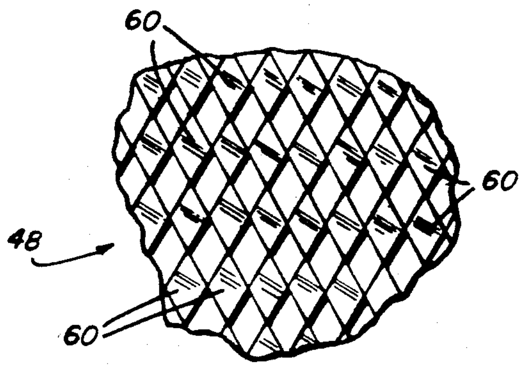
FIG. 5 is a much enlarged, partial view of a metallic insert for use in the invention, illustrating a knurled pattern in accordance with alternative teachings of the invention.

As alternatives to the above-identified sandblasting procedure for roughening the surface of insert 48, it is also possible to provide this surface by embossing, acid etching and knurling. In the situation wherein the latter technique is used (as illustrated in FIG. 5), a pattern of diamond-shaped knurls 60 is provided within the insert's exterior (shown only partially in FIG. 5). Preferably, from about 800 to 1200 diamond-shaped knurls are formed per square inch of exterior surface of insert 48, and over the same area illustrated for the sandblasted portion in FIG. 4. In one particular example, 800 knurls were formed in an insert having such an area of about 0.8 square inch. Total penetration (depth) of each was about 0.006 inch or about 33 percent of the insert's thickness. Preferably from about 25 to about 40 percent of this thickness is penetrated to achieve the results taught herein. In the case of sandblasting, a depth of penetration of about 0.004 inch was attained.

There has thus been shown and described an improved replaceable lamp unit for use in an automobile headlight wherein the unit's metallic insert, a significant part of the unit which is directly or indirectly secured to the unit's tungsten halogen lamp, is fixedly secured to the unit's plastic holder in a more rapid, facile manner readily adaptable to mass production. Alignment of the insert relative to the holder is thus greatly facilitated, as is the bond between holder and insert.

While there have been shown and described what are at present considered the preferred embodiments of the invention, it will be obvious to those skilled in the art that various changes and modifications may be made therein without departing from the scope of the invention as defined by the appended claims.

We claim:

1. In a replaceable lamp unit for use within an automobile headlight wherein said unit includes a plastic holder and a metallic insert to which the lamp of said unit is directly or indirectly attached, said insert being positioned within said holder and secured thereto by induction heating and having an exterior surface for engaging said holder when so positioned therein, the improvement wherein said exterior surface includes a roughened texture to provide enhanced securement to said holder.

2. The improvement according to claim 1 wherein said exterior surface is sandblasted.

3. The improvement according to claim 1 wherein said exterior surface is knurled.

4. The improvement according to claim 3 wherein the number of knurls in said exterior surface is within the range of from about 800 to about 1200 per square inch of the area of said exterior surface having said knurls therein.

5. The improvement according to claim 3 wherein each of said knurls is of a diamond-shaped configuration.

6. The improvement according to claim 3 wherein said knurls occupy a depth within said exterior surface of said metallic insert of from about 25 percent to about 40 percent of the total thickness of said insert.

7. The improvement according to claim 1 wherein said exterior surface is embossed.

8. The improvement according to claim 1 wherein said exterior surface is acid etched.

* * * * *